No. 868,166. PATENTED OCT. 15, 1907.
W. W. DOOLITTLE.
NIPPLE MAKING MACHINE.
APPLICATION FILED AUG. 9, 1906.
6 SHEETS—SHEET 3.
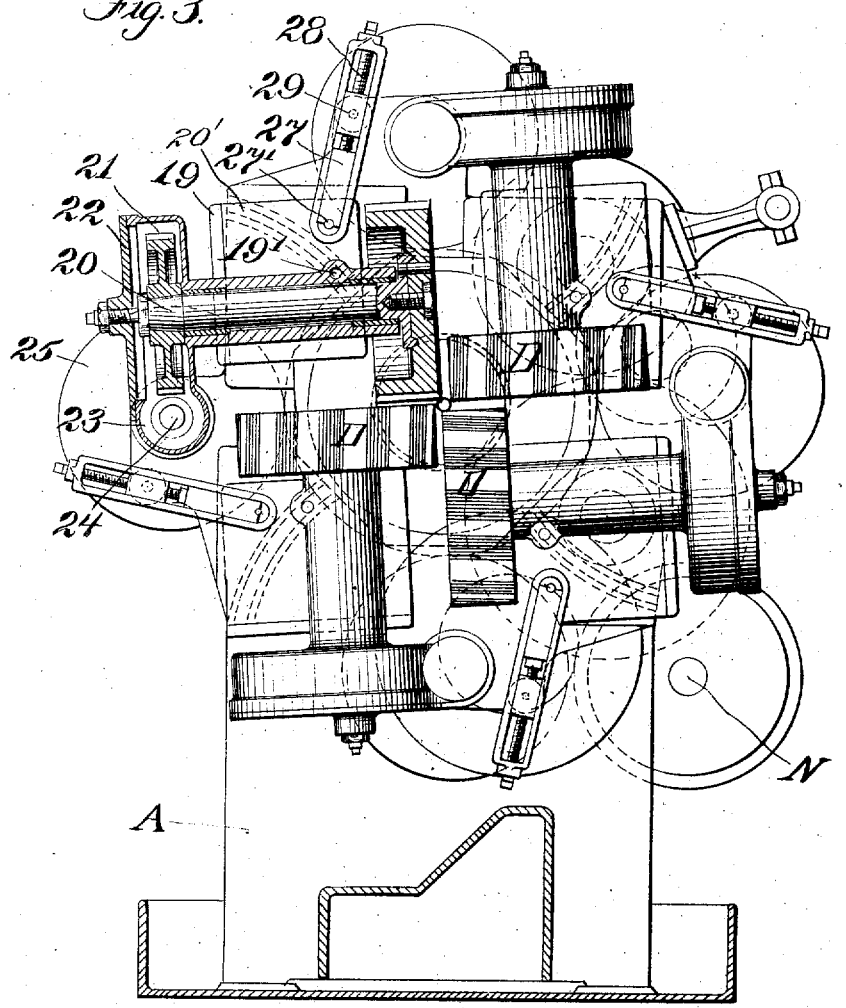
WITNESSES
INVENTOR
William W. Doolittle
by attys No. 868,166.

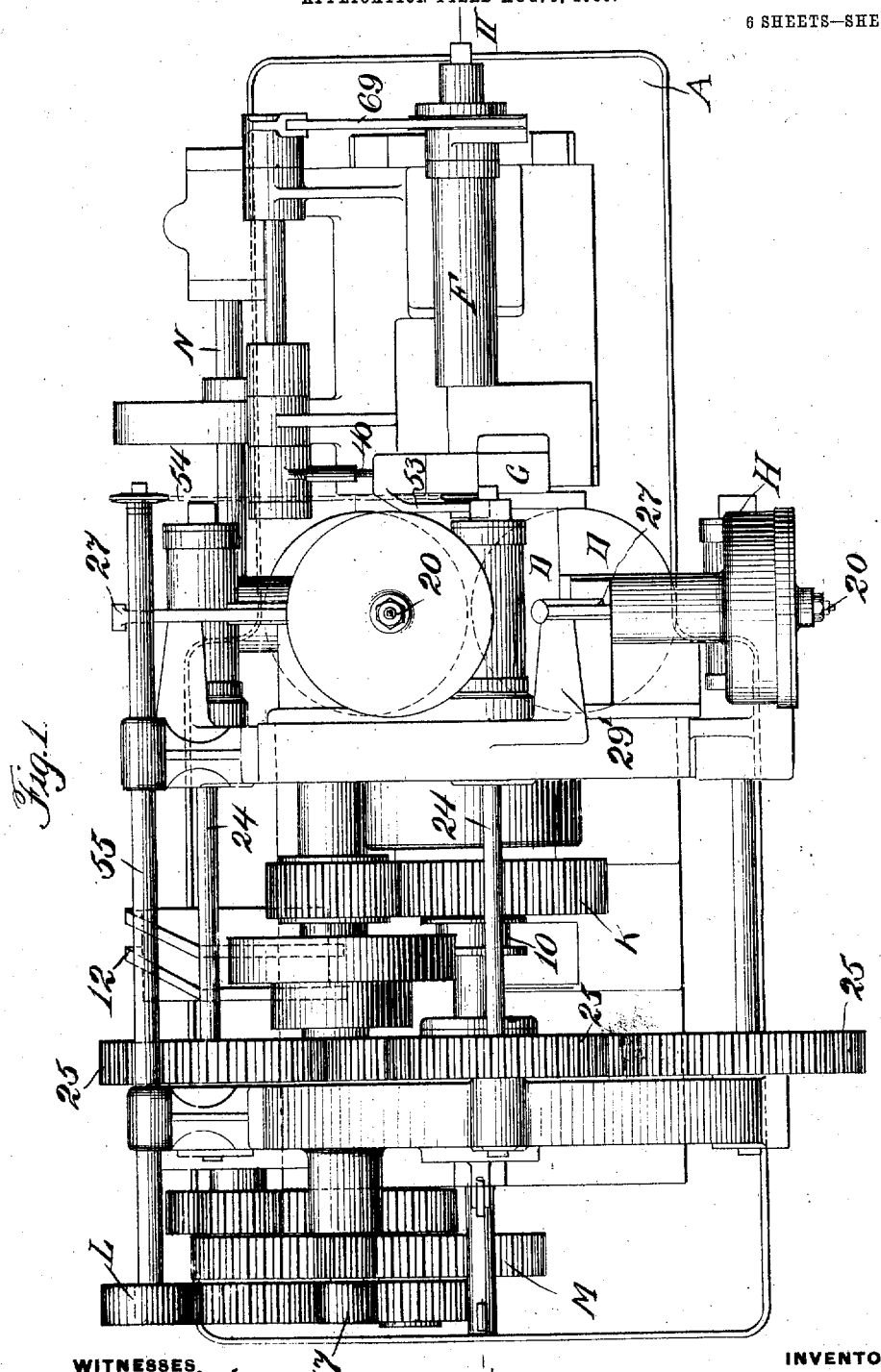

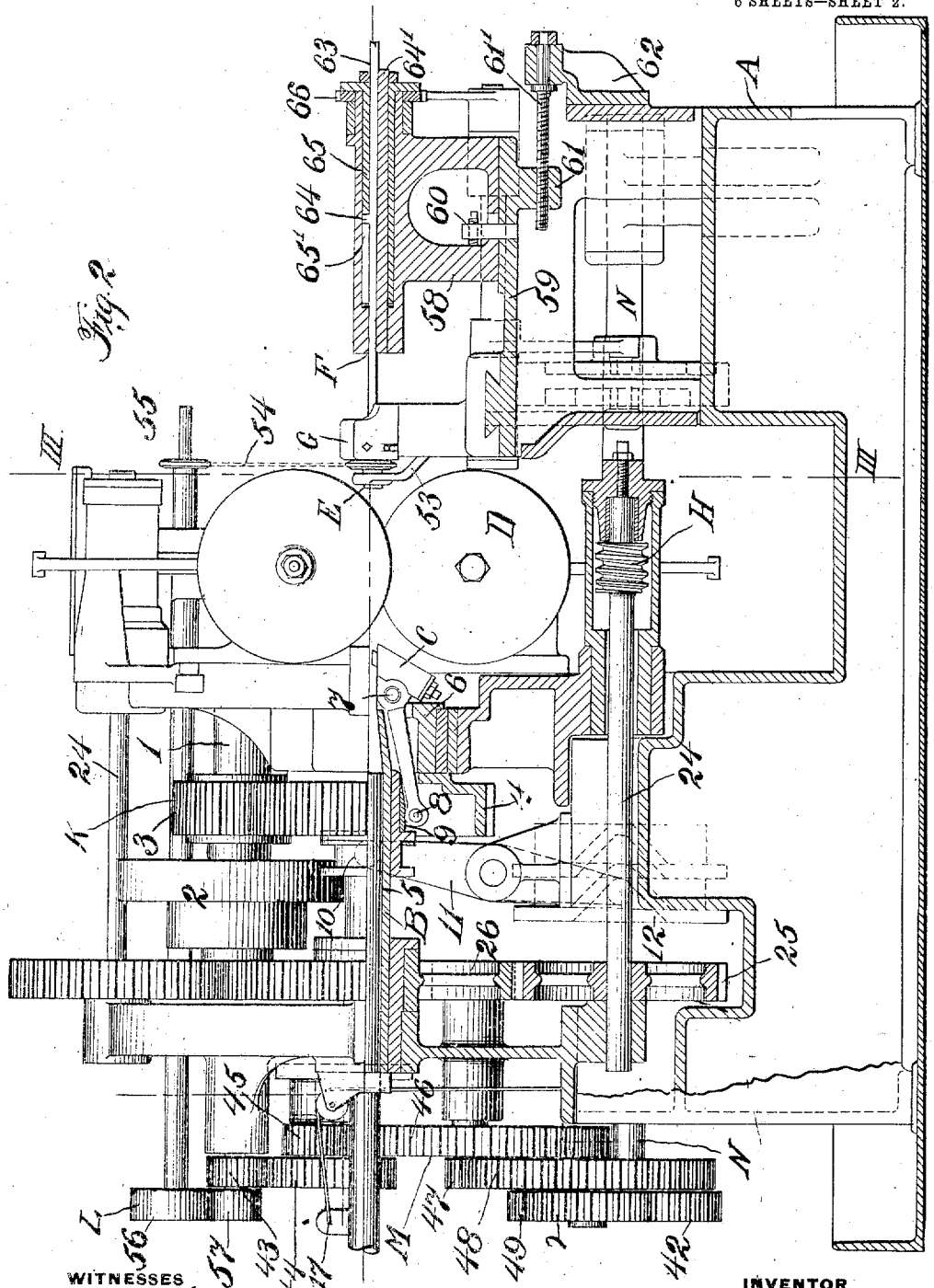

PATENTED OCT. 15, 1907.

W. W. DOOLITTLE.
NIPPLE MAKING MACHINE.
APPLICATION FILED AUG. 9, 1906.

6 SHEETS—SHEET 4.

WITNESSES
Harry L. Lechner
J. C. Bradley

INVENTOR
William W. Doolittle
by attys
Synnestvedt & Carpenter

No. 868,166.
PATENTED OCT. 15, 1907.
W. W. DOOLITTLE.
NIPPLE MAKING MACHINE.
APPLICATION FILED AUG. 9, 1906.
6 SHEETS—SHEET 5.
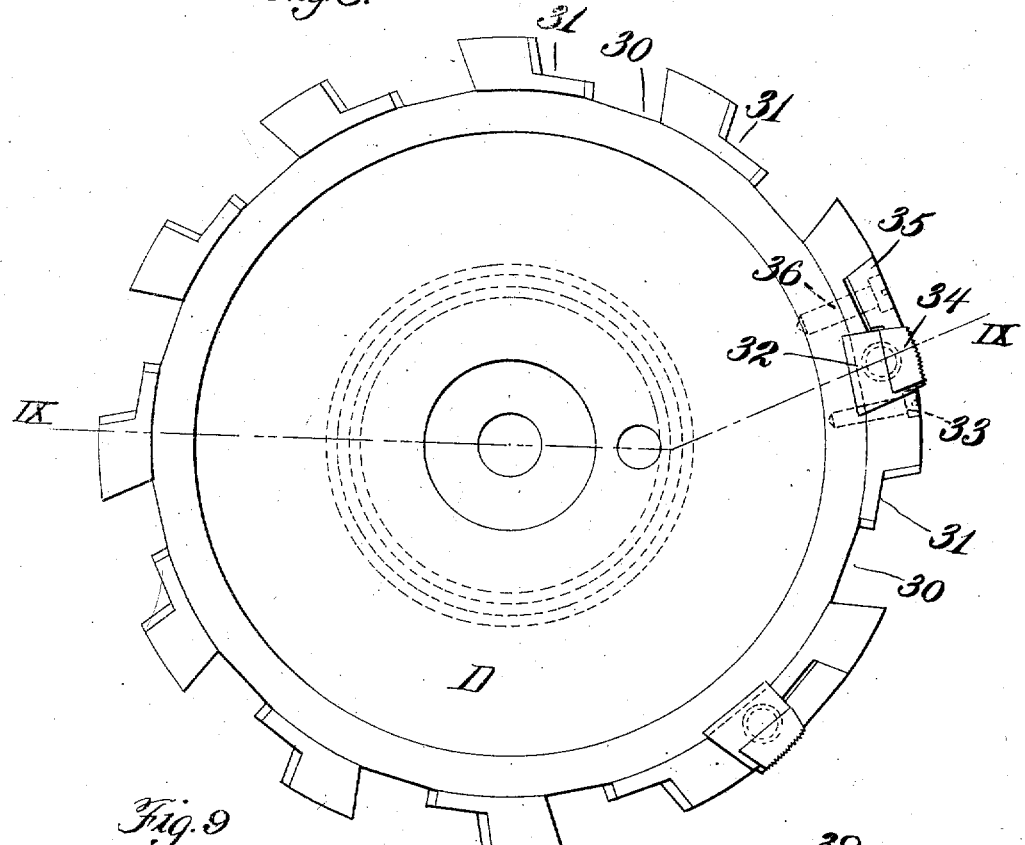
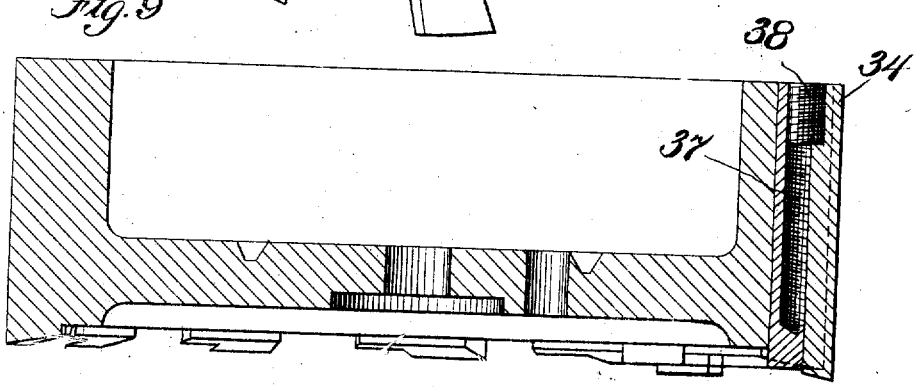
WITNESSES
INVENTOR.
William W. Doolittle
by attys

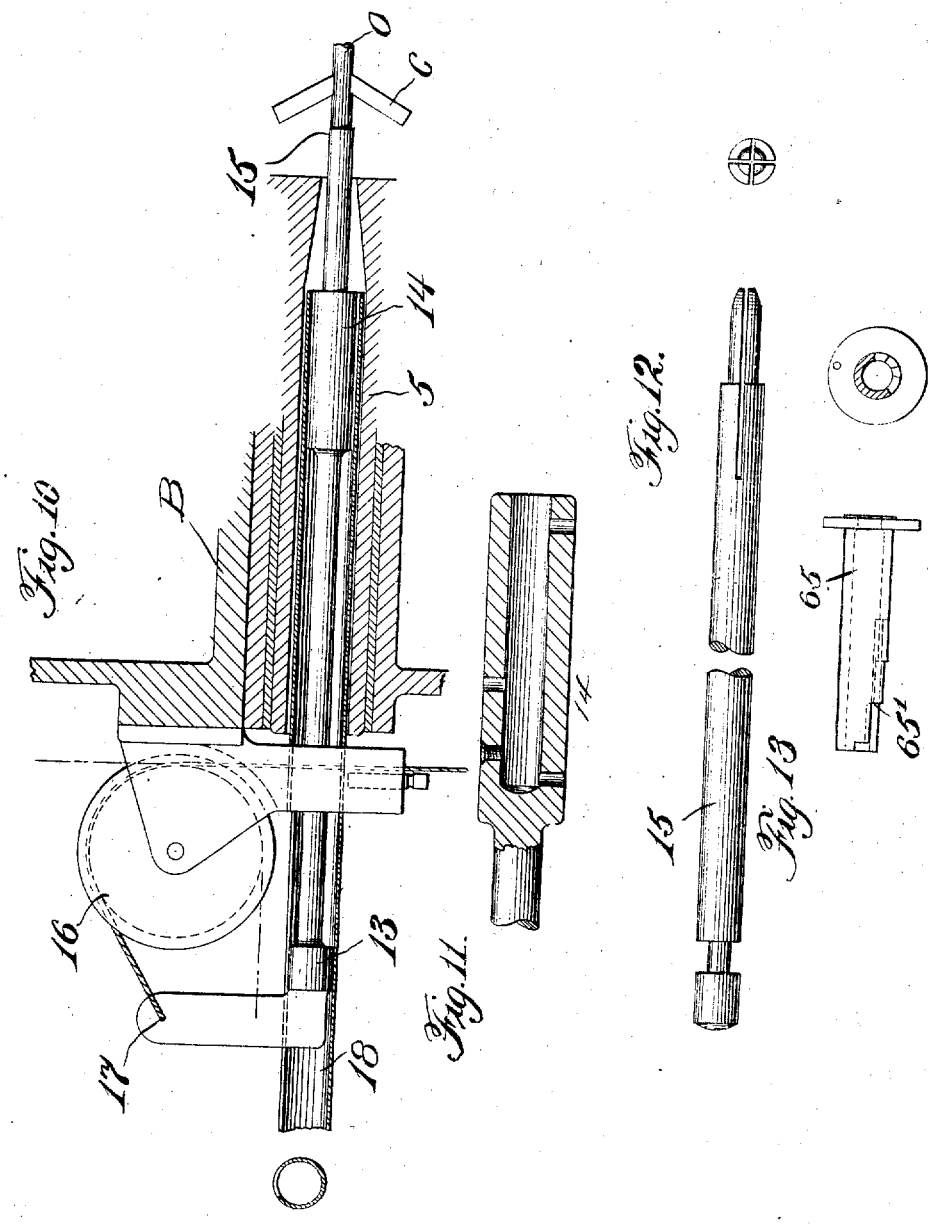

UNITED STATES PATENT OFFICE.

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

NIPPLE-MAKING MACHINE.

No. 868,166.

Specification of Letters Patent.

Patented Oct. 15, 1907.

Application filed August 9, 1906. Serial No. 329,888.

*To all whom it may concern:*

Be it known that I, WILLIAM W. DOOLITTLE, a citizen of the United States, residing at Evanston, in the county of Cook and State of Illinois, have invented certain new and useful Improvements in Nipple-Making Machines, of which the following is a specification.

Figure 4:
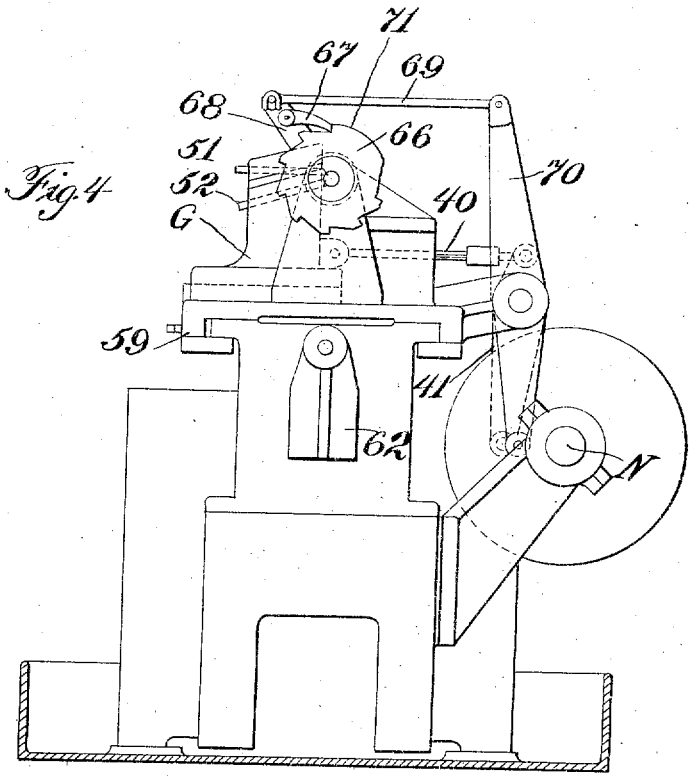

The invention relates to a machine for making external threaded nipples and has for its objects: to provide an improved machine adapted to cut tapered nipples continuously from an extended blank pipe; to provide a machine in which the mechanism for producing the taper and cutting the thread is greatly simplified; to provide an automatic stop mechanism for positioning the stock both before and after the nipples are severed from the stock; to provide a support for the stock adapted to engage and support the threaded portion thereof without injury; to provide improved means for severing the nipples from the body of the pipe; to provide an improved threading mechanism and mount therefor and one which, after being once adjusted, will operate for a long period and on a great quantity of work without requiring any adjustment or change of dies; and finally, to provide a novel arrangement of dies, feed, and operating mechanism whereby increased rapidity of production is secured together with greater accuracy of product. One form of the invention is shown in the accompanying drawings in which, Figure 1 is a plan view, Figure 2 is a side elevation and section, the section being of the lower half of the machine along the line II—II of Figure 1, Figure 3 is a transverse section on the line III—III of Figure 2, with the parts of one cutter broken away to show the driving means, Figure 4 is an elevation of the right hand end of the machine, Figure 5 is an enlarged detail of the pipe after the tapered threads are cut, showing by dotted lines X—X the points at which the blank is cut to form the nipples, Figure 6 is a detail view of the pipe and cutting off tools, Figure 7 is a detail view of the tools in cutting position, Figure 8 is a side elevation of one of the threading disks, Figure 9 is a transverse section through Figure 8 on the line IX—IX, Figure 10 is an enlarged longitudinal section through the feeding mechanism, Figure 11 is a section through the head of the feed rod, Figure 12 is a side elevation of the split engaging rod, Figure 13 is a side elevation and section through the stop sleeve.

Figure 5:
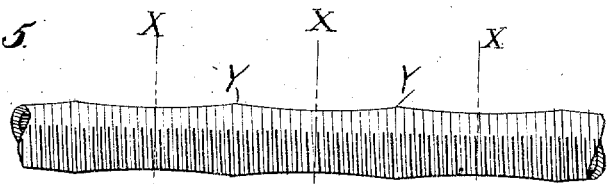
Figures 6, 7:
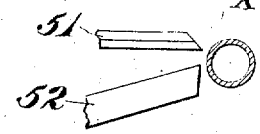

The machine is designed to produce the ordinary externally threaded nipples which taper from the center to the end (Figure 5) from continuous stock, and the machine comprises primarily, a mechanism for clamping and rotating the blank or stock and feeding it step by step to the threading mechanism, means for moving the threading dies along the pipe for producing the pitch of the thread and securing the desired taper, and means for cutting the nipples off at the lines marked X—X in Figure 5, together with stop mechanism for positioning the pipe when the clamp is released and the stock fed along intermediate each of the cutting operations.

Describing first the principal parts of the machine briefly and referring particularly to the general views 1, 2, and 3, A is the frame of the machine, B is the rod feeding means (Figure 2 and in detail in Figure 10), C is the clamp for rotating the pipe after feeding and during the threading operation, D are the threading disks each provided with a plurality of cutting dies which disks are adapted to be fed rotarily in an arc along the rotating pipe, thereby producing the pitch and because of the movement of the arc giving the taper shown in Figure 5, E is the sleeve for supporting the threaded end of the pipe and is rotated in the direction of rotation of the pipe, F is the stop mechanism having means for positioning the end of the pipe, which stop moves back step by step, until the nipples commence to be severed after which time the stop remains stationary, G is the transversely reciprocatory carriage for the cutters which sever the nipples from the stock, H is the mechanism for rotating the disks D, K is the gearing for operating the clamp C, L is the train of gearing for rotating the sleeve E, and M is the train of gearing for operating the countershaft N which shaft N operates the carriage G and stop mechanism F.

The general arrangement having been outlined, a detail description of the parts will now be given referring first to the clamping mechanism C (Figure 2). This mechanism as shown, comprises two opposing jaws which are rotated from the drive shaft 1, which carries the drive pulley 2, by means of the gear 3 on the shaft 1 meshing with the gear 4, keyed to the hollow shaft 5, which shaft 5 has an enlarged end portion 6 to which the two clamping jaws C are pivoted at 7. The jaws are provided with the operating levers 8 which are adapted to be swung outward by means of the camming member 9, slidably mounted upon the shaft 5 which member 9 is provided with a grooved pulley 10 engaging the end of the operating lever 11, the other end of such operating lever being in engagement with the cam groove of the wheel 12, which wheel 12 is mounted on the countershaft N, heretofore referred to. It will be seen that by this means the clamping jaws C are periodically opened and shut thereby releasing and engaging the pipe extending through the shaft 5. The means by which the shaft is fed through shaft 5 and the jaws C when such jaws are opened, is shown in detail in Figure 10. As shown in this figure, the member 13 is provided for pushing the pipe forward, which member 13 is provided at its front end with the head 14, recessed as indicated in Figure 11, and adapted to receive the end of the pipe carrying rod 15, shown in Figure 12. This pipe carrying means 15 fits into the head 14 at its rear end and at its front end is split as shown in Figure 12, to provide a spring end over which the pipe O fits, thereby securing a firm engagement between the pipe and the engaging member. The member 13 is advanced to the shaft 5 by means of a weight (not shown) which is secured to a cable passing over the wheel 16 and engaging the upturned end 17 of the member 13. This provides a means constantly tending to feed the rod O forward against the stop mechanism F whenever the clamping jaws C which rotate the pipe are opened. In order that the member 13 may be properly guided and supported, an additional pipe member 18 is fitted in the shaft 5 and provided with a slot upon its upper side through which the upturned portion 17 is adapted to slide.

The threading disks will next be described, reference being had particularly to the general view 1, 2, and 3, and the detail views 8 and 9 of the cutting disk. As shown in the drawings (Figure 3) four threading disks are preferably used although it will be apparent that a less number may be used if desired, which disks D are rotatively supported from the frame and lie in planes substantially parallel with the axis of the pipe. The disks are so positioned that the dies which are spaced around the circumference of the various disks come directly opposite each other and this set of four opposing dies is adapted to thread a portion of the pipe equal to the length of the nipple. As the pipe is not fed longitudinally during the threading it will be seen that it is necessary to feed the dies in order to provide for the pitch of the thread and this feed of the threading dies is provided by means of the rotation of the disks about their respective axes, the amount of feed being proportional to the desired pitch. As the periphery of the disks move in arcs of circles and hence do not move in a line parallel to the axis of the pipe blank, it will be apparent that the blank is threaded in a succession of curved portions with the parts Y of larger diameter (Figure 5) and when the nipples are cut off on the line X—X they will not be tapered on a straight line but the line of taper is sufficiently near to a straight line to serve the purpose. As best shown in Figure 3, each of the cutting disks is rotatively mounted upon a block 19, the disk shaft 20 carrying at one end the cutter disk D and at the other end the worm wheel 21, the whole being inclosed in a gear casing 22. The gears 21 engage worms 23 on shafts 24 which shaft 24 carry at their other ends spur wheels 25 (Figures 1 and 2), which spur wheels each engage with a central drive gear 26 keyed to the rotative hollow shaft 5. Each of the blocks 19 which carries the cutter disks and driving mechanism is slidably supported from the frame by means of the engagement of a headed stud 19' with the dovetailed groove 20' (Figure 3) so that the threading disk may be moved outwardly about the shaft 24 as an axis. The adjustment of the cutter disk with regard to the blank to be cut is secured by means of the block 27 pivoted to the block 19 by means of the bolt 27', which block 27 is provided with an adjusting screw 28 swiveled therein carrying adjustably the block 29 which block 29 is in turn pivotally secured to the arm 29' on the frame of the machine. When it is desired to swing the cutter disk entirely out of position for the purpose of replacing or adjusting the parts, the bolt 27' is removed, the block 27 swung to one side and the cutter disk swung out about the shaft 24 as an axis. When the threading disk is swung back to position and the bolt 27' put into place, the adjustment of the block 29 will of course be the same. It will be apparent that by providing a plurality of cutters upon each threading disk the operation of the machine is practically continuous for as soon as one die finishes its cutting operation and releases the pipe a new portion thereof is fed up by the feeding mechanism C and positioned and by the time such operation is completed, another cutting die has been rotated into position. It will also be apparent that because of the large number of dies the disks may operate for a long period of time and upon a great quantity of work without change or adjustment of dies and furthermore, because of the time elapsing between the use of the same die, such die has an opportunity to cool, and hence may cut at a higher speed than if it were in continuous use. Referring now more particularly to the precise construction of the threading disk as shown in Figures 8 and 9, it will be seen that the disk consists of a cored out member provided on its periphery with a plurality of transverse dovetailed grooves 30 each provided at the side with a recess 31. A block 32 is adapted to fit into the dovetailed recess and is held from longitudinal movement by means of the screw 33 passing through the edge thereof. The cutter 34 rests upon this block 32 and is held in position thereon by means of the wedge 35 which wedge 35 is secured to the disk by means of the screw 36. Reference to Figure 9 will indicate the means by which adjustment of the cutter 34 transversely of the threading disk 30 is secured, which adjustment is necessitated because of the wear incident to the cutting by the end of the die 34. The member 32 is screw threaded at 37 as is also the member 34 for a short distance and a plug 38 fits the threads on the members 37 and 34 and provides means whereby the position of the cutter may be adjusted preliminary to the clamping tightly in place by means of the wedges 35 and screws 36. The radial adjustments of the dies 34 may be secured by changing the thickness of the blocks 32. Means are thus provided for the exact positioning of the die block 34.

The mechanism for cutting off the finished nipples will now be described, reference being had particularly to Figures 2 and 4. As shown, the carriage G is slidably mounted for movement transversely of the body of the machine and has secured pivotally at its front side the connecting rod 40 pivoted to the top of the operating lever 41 which operating lever has at its lower end a roller engaging a cam on the countershaft N which shaft N carries upon its left hand end the drive gear 42 (Figure 2) driven by the train of gearing M heretofore referred to. This train of gearing includes, commencing with the gear 43 on the end of the drive shaft 1, the gears 43, 44, 45, 46, 47, 48, 49, and 50, as indicated in Figure 2, which gearing it will be noted, is a reducing train so that the shaft N runs at a very low rate of speed as compared with the shaft 1. The carriage G supports, as indicated in Figures 4, 6, and 7, two cutting tools 51 and 52, which tools are removably mounted for replacement, the tool 51 being a diamond point and adapted to bevel off the end of the nipple and the tool 52 being a flat one for finishing the cut and severing the nipple completely. In order to support the threaded end of the pipe adjacent the cutting tool, a sleeve E is provided which is supported on the frame A by means of the bracket 53 and is adapted to not only steady the pipe during cutting but also to steady the pipe while the threading dies are operating. In order that the pipe threads may not be injured by pressing on this sleeve while rotating therein, means are provided for rotating the sleeve in the same direction and at the same speed that the pipe is rotating which means comprises a sprocket connection 54 with the shaft 55 which shaft extends to the left hand end of the machine and carries on its extreme end the pulley 56 having belt connection with the pulley 57 on the end of the shaft 1, the whole constituting the train of gearing heretofore referred to, as the train L.

The stop mechanism F as shown in Figures 2 and 4, will now be described. This stop mechanism is necessitated by the fact that the feed B shown in Figure 10 tends to continuously feed the rod under the tension of the weight when the clamp C is opened, and some means must be provided for limiting the forward movement when such opening of the clamp C occurs. The stop mechanism is mounted upon the base 58 which base 58 is slidably mounted upon the table 59 and is adjustable thereon by means of the set screw 60 whereby any change of position due to wear may be adjusted. The table 59 which carries both the stop mechanism F and carriage G is also adjustable as will be noticed from Figure 2, the projection 61 on the bottom of such table engaging the adjusting screw 61' secured to the brackets 62. Extending longitudinally through the cylindrical top of the part 58 is the stop rod 63 which is adapted to engage the end of the pipe and position it when such pipe is fed along by means of the feeding mechanism. If this rod were not to position the blank until the nipples were cut off, it is apparent that it might be stationary and the cutting off of a nipple by the cutters 51 and 52 would permit the pipe to be advanced exactly a proper distance in order to be positioned for another cutting; but as it is desired to use the stop mechanism for positioning the pipe before such pipe reaches the cutting off mechanism 51—52, means are provided for permitting of a step by step motion rearwardly of the rod 63 until the end of such rod reaches a point to the right of the cutting off mechanism 51—52 after which period such rod is allowed to remain stationary. To accomplish this result the rod 63 has secured thereto a stop pin 64 and a rotatable stop sleeve 65 is provided, which latter is shown in detail in Figure 13. As here shown, the sleeve 65 has a stepped slot 65' along the one side, the successive steps of which slot are apart the length of the nipples, so that when the stop pin 64 engages successively the different steps, the front or positioning end of the rod 63 will be held successively at varying distances which distances vary by the length of the nipple. In order that the projection 64 may be free from one step to allow it to move to the next step the sleeve 65 must be rotated and means are provided whereby this is automatically accomplished before the clamps C are opened and the blank fed forward. The mechanism consists of a ratchet wheel 66 secured to the sleeve and operable by the pawl 67 carried on the lever 68 which lever 68 is operated by means of the connecting rod 69 and operating lever 70, engaging at its lower end a cam on the countershaft N. The operation of the pawl 67 will turn the sleeve 65 just far enough to allow the pin 64 to disengage itself from the step upon which it is engaged and place it in position to engage the next step and when the smooth portion 71 of the ratchet wheel is reached by the pawl the device will of course cease turning, and the stop rod 63 will have reached its rearmost position at which time the nipples are being cut off by the cutting tools and hence no further retraction of the stop 63 is necessary. In order that the rod 63 may not turn, it is made square and fits in a squared slot in the member 64' which member has a driving fit in the cylindrical top of the part 58 and hence is not rotatable.

The operation of the machine briefly stated is as follows:

A blank pipe having been inserted through the tube 13 in the hollow shaft 5 and pushed forward until its end is adjacent to the cutters D, power is applied to the pulley 2 on the shaft 1 thereby driving the gears 3 and 4 and turning the clamping members C, which are in engagement with the pipe, the cam 9 being in a position shown in Figure 2. At the same time the threading disks D are gradually turned forward by means of the gear 26 on the hollow axis 5 engaging the gears 26 on the shafts 24 which carry the worms 23 for rotating the threading disks thereby threading a section of the pipe equal to the distance between the lines X—X in Figure 5. The threading dies having passed out of engagement with the blank, such blank is free to be fed forward a step and the jaws C are released by the actuation of the camming member 9 to the rear by the cam 12 and lever 11 and the feeding rod 13 actuated by its weight, pushes the pipe forward a distance equal to the length of the nipple at which time it engages the end of the stop rod 63. By the time this operation is accomplished a second set of threading dies on the threading disks D have been fed to a position of engagement with the pipe and the clamp C closed by the member 9 which clamp then revolves the pipe O between the cutting dies completing the operation, as heretofore set forth. In the meantime the stop 63 has been adjusted for a position one nipple's length to the rear of its previous position by means of the positioning of the stop sleeve 65 with another step in line with the pin 64 so that the pin 64 and the stop rod 63 can be moved to the rear when the pipe is again advanced by means of its feeding mechanism. This operation is repeated until the threaded blank passes through the sleeve E and beyond the cutting tools 51 and 52 on the carriage G at which time the cam on the countershaft N operating the lever 41 and connecting rod 30 pulls the carriage G forward, cutting off a nipple which drops through the machine. The stop sleeve 65 has now been rotated to such an extent that the ratchet wheel secured thereto has its smooth portion 71 opposite the pawl 67 and no further rotation of the sleeve occurs.

Having thus described my invention and illustrated its use, what I claim as new and desire to secure by Letters Patent, is the following:

1. In combination, a hollow rotatable pipe holder provided with a chuck for gripping the pipe, means for feeding the pipe step by step through the chuck, a tool support, and a threading tool pivoted thereto and adapted to swing in a plane parallel to the axis of the pipe holder, and means for feeding the tool through its arc.

2. In combination, a relatively rotatable pipe holder and supporting means, means for feeding the pipe longitudinally fixed distances step by step, a threading tool mounted on the said supporting means to swing in an arc in a plane parallel to the axis of the pipe holder, and means adjacent to the line of feed and following the threading tool for cutting the stock midway between successive points of greatest diameter on the stock.

3. In combination, a relatively rotatable pipe holder and supporting means, means for feeding the pipe longitudinally fixed distances step by step, and a threading tool mounted on the said supporting means to swing in an arc in a plane parallel to the axis of the pipe holder.

4. In combination, a relatively rotatable pipe holder and supporting means, means for feeding the pipe longitudinally fixed distances step by step, a plurality of disks pivotally mounted on the supporting means about the pipe axis and lying in planes substantially parallel to the axis of the pipe holder, and provided with threading dies, and means for feeding the disks rotatively.

5. In combination, a relatively rotatable pipe holder adapted to permit of the step-by-step movement of a pipe therethrough and supporting means, a disk pivotally mounted on the supporting means and lying in a plane parallel to the axis of the pipe holder and provided with a plurality of threaded dies spaced about its periphery and means for feeding the disk rotatively.

6. In combination, a relatively rotatable pipe holder and supporting means, a disk pivotally mounted on the supporting means and lying in a plane parallel to the axis of the pipe holder and provided with a plurality of threading dies spaced about its periphery, means for feeding the disks rotatively, and means for advancing the pipe the length of a nipple after the disengagement of one die and before the engagement of another.

7. In combination, means for rotating a pipe, means for giving the pipe a step by step movement longitudinally, a threading die mounted to swing in an arc longitudinally of the axis of the pipe, and means for feeding the die through its arc.

8. In combination, means for rotating a pipe, means for feeding the pipe longitudinally step by step, threading means in the line of feed comprising a plurality of disks spaced about the axis of the pipe in planes parallel thereto and each provided with a plurality of spaced threading dies, and means for feeding the disks rotatively.

9. In combination, a threading disk provided upon its periphery with a plurality of threading dies spaced apart, each of which comprises a plurality of cutting teeth extending transversely of the face of the disk and means for adjusting the dies transversely of the disk.

10. In combination, a threading disk provided upon its periphery with a transverse dovetailed groove with a recess at the side thereof, a block fitting the groove, means for holding the block in place, a cutting die mounted upon the block, a wedge engaging the edge of said recess on one side and the die on the other, and means for securing the wedge to the disk.

11. In combination, means for holding and rotating a pipe, cutting means adjacent the end of such first means, and supporting means for the outer end of the pipe comprising a sleeve provided with connections for rotating it in the same direction that the pipe is rotated.

12. In combination, rotatable clamping means, adapted to receive a pipe, means for intermittently operating such clamping means, yieldingly pressed means tending to feed the pipe through the clamping means, intermittently operating cutting means adjacent the clamping means, a stop rod on the other side of the cutting means for engaging the end of the pipe and positioning it when the clamps are opened, and automatic means for producing a backward movement of the rod a predetermined distance when the clamp is opened.

13. In combination, a stop mechanism comprising a stop sleeve having engaging means spaced along its length at different angular positions, a stop rod passing therethrough and provided with means for engaging the engaging means on the sleeve and means whereby the sleeve may be rotated to bring the various engaging means on the sleeve in position to engage the engaging means on the rod.

14. In combination, a stop mechanism comprising a stop sleeve having engaging means spaced along its length at different angular positions, a stop rod passing therethrough and provided with means for engaging the engaging means on the sleeve and a pawl and ratchet whereby the sleeve may be rotated to bring the various engaging means on the sleeve in position to engage the engaging means on the rod.

15. In combination, a stop mechanism comprising a stop sleeve having engaging means spaced along its length at different angular positions, a stop rod passing therethrough and provided with means for engaging the engaging means on the sleeve, a ratchet secured to the sleeve and having a portion of its surface blank, and an intermittently operated pawl engaging the ratchet whereby the sleeve may be rotated to bring the various engaging means on the sleeve in position to engage the engaging means on the rod and then cease to operate the sleeve when the blank space on the ratchet is reached.

16. In combination with a stock feeding, threading, and cutting off mechanism, of a supporting sleeve intermediate the threading and cutting off means, and means for rotating such sleeve in the direction of rotation of the stock.

In testimony whereof, I have hereunto signed my name in the presence of the two subscribed witnesses.

WILLIAM W. DOOLITTLE.

Witnesses:
PAUL CARPENTER,
JAMES NICHOLAS LORENZ.